(12) United States Patent
Li et al.

(10) Patent No.: US 7,739,645 B2
(45) Date of Patent: Jun. 15, 2010

(54) METHOD AND APPARATUS FOR DETERMINING A PROCESS MODEL USING A 2-D-PATTERN DETECTING KERNEL

(75) Inventors: Jianliang Li, Hillsboro, OR (US); Qiliang Yan, Portland, OR (US); Lawrence S. Melvin, III, Hillsboro, OR (US)

(73) Assignee: Synopsys, Inc., Mountain View, CA (US)

( * ) Notice: Subject to any disclaimer, the term of this patent is extended or adjusted under 35 U.S.C. 154(b) by 487 days.

(21) Appl. No.: 11/800,171

(22) Filed: May 4, 2007

(65) Prior Publication Data

US 2008/0276211 A1   Nov. 6, 2008

(51) Int. Cl.
*G06F 17/50* (2006.01)

(52) U.S. Cl. .................. 716/11; 716/4; 716/12

(58) Field of Classification Search .......... 716/4, 716/11, 12
See application file for complete search history.

(56) References Cited

U.S. PATENT DOCUMENTS 7,234,128 B2 * 6/2007 Gau et al. ................... 716/19

* cited by examiner

*Primary Examiner*—Thuan Do
(74) *Attorney, Agent, or Firm*—Park, Vaughan & Fleming LLP

(57) ABSTRACT

One embodiment provides a system for determining an improved process model that models one or more semiconductor manufacturing processes. During operation, the system can receive a first process model. Next, the system can receive a 2-D-pattern detecting kernel which can detect 2-D patterns. The system can then receive a second set of empirical data which is associated with 2-D patterns in a test layout. Next, the system can determine an improved process model using the first process model, the 2-D-pattern detecting kernel, the test layout, and the second set of empirical data.

20 Claims, 3 Drawing Sheets

METHOD AND APPARATUS FOR DETERMINING A PROCESS MODEL USING A 2-D-PATTERN DETECTING KERNEL

FIELD OF THE INVENTION

The present invention relates to integrated circuit design and fabrication. More specifically, the present invention relates to a method and an apparatus to determine a process model that uses a 2-D-pattern detecting kernel.

BACKGROUND

Related Art

Rapid advances in computing technology have made it possible to perform trillions of computational operations each second on data sets that are sometimes as large as trillions of bytes. These advances can be attributed to the dramatic improvements in semiconductor manufacturing technologies which have made it possible to integrate tens of millions of devices onto a single chip.

As semiconductor design enters the deep submicron era, process model accuracy is becoming increasingly important. Inaccuracies in the process model negatively affect the efficacy of downstream applications. For example, inaccuracies in the photolithography process model can reduce the efficacy of optical proximity correction (OPC). Hence, it is generally desirable to improve process model accuracy.

Summary

One embodiment of the present invention provides a system for determining an improved process model that models one or more semiconductor manufacturing processes. The system can receive a test layout and empirical data that is obtained by subjecting the test layout to one or more semiconductor manufacturing processes. Next, the system can generate an accurate process model using the test layout and the empirical data. The process model can use a kernel that can differentiate between 1-D (one dimensional) regions and 2-D (two dimensional) regions in a layout.

In one embodiment, the system can categorize the empirical data into 1-D empirical data and 2-D empirical data. The 1-D empirical data is associated with 1-D patterns and/or regions in the layout, whereas the 2-D empirical data is associated with 2-D patterns and/or regions in the layout. The system can then generate a first process model using the 1-D empirical data. Note that the first process model may not include a 2-D-pattern detecting kernel. Next, the system can generate an improved process model using the first process model, a 2-D-pattern detecting kernel, and the 2-D empirical data.

DETAILED DESCRIPTION

Integrated Circuit (IC) Design Flow

Figure 1:
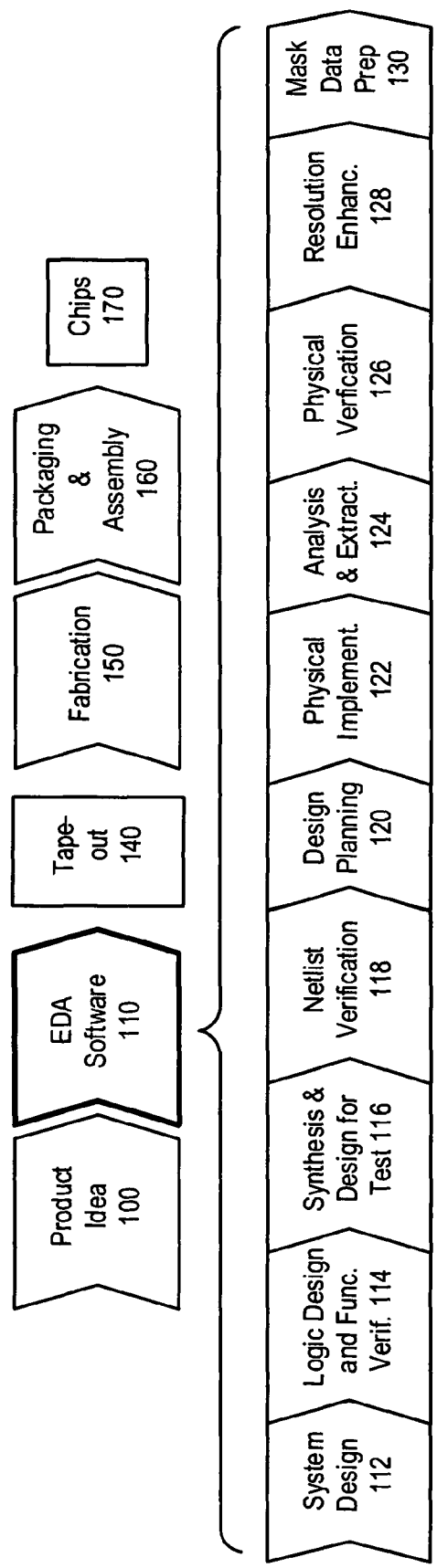
FIG. 1 illustrates various steps in the design and fabrication of an integrated circuit in accordance with an embodiment of the present invention.

FIG. 1 illustrates various steps in the design and fabrication of an integrated circuit in accordance with an embodiment of the present invention.

The process starts with the conception of the product idea (step 100) which is realized using an EDA software design process (step 110). When the design is finalized, it can be taped-out (event 140). After tape out, the fabrication process (step 150) and packaging and assembly processes (step 160) are performed which ultimately result in finished chips (result 170).

The EDA software design process (step 110), in turn, comprises steps 112-130, which are described below. Note that the design flow description is for illustration purposes only. This description is not meant to limit the present invention. For example, an actual integrated circuit design may require the designer to perform the design steps in a different sequence than the sequence described below. The following discussion provides further details of the steps in the design process.

System design (step 112): In this step, the designers describe the functionality that they want to implement. They can also perform what-if planning to refine functionality, check costs, etc. Hardware-software architecture partitioning can occur at this stage. Exemplary EDA software products from Synopsys, Inc. that can be used at this step include Model Architect, Saber®, System Studio, and DesignWare® products.

Logic design and functional verification (step 114): At this stage; the VHDL or Verilog code for modules in the system is written and the design is checked for functional accuracy. More specifically, the design is checked to ensure that it produces the correct outputs. Exemplary EDA software products from Synopsys, Inc. that can be used at this step include VCS®, Vera®, DesignWare®, Magellan™, Formality®, ESP and Leda® products.

Synthesis and design for test (step 116): Here, the VHDL/Verilog is translated to a netlist. The netlist can be optimized for the target technology. Additionally, tests can be designed and implemented to check the finished chips. Exemplary EDA software products from Synopsys, Inc. that can be used at this step include Design Compiler®, Physical Compiler®, Test Compiler, Power Compiler™, FPGA Compiler, TetraMAX®, and DesignWare® products.

Netlist verification (step 118): At this step, the netlist is checked for compliance with timing constraints and for correspondence with the VHDL/Verilog source code. Exemplary EDA software products from Synopsys, Inc. that can be used at this step include Formality®, PrimeTime®, and VCS® products.

Design planning (step 120): Here, an overall floorplan for the chip is constructed and analyzed for timing and top-level routing. Exemplary EDA software products from Synopsys, Inc. that can be used at this step include Astro™ and IC Compiler products.

Physical implementation (step 122): The placement (positioning of circuit elements) and routing (connection of the same) occurs at this step. Exemplary EDA software products from Synopsys, Inc. that can be used at this step include the Astro™ and IC Compiler products.

Analysis and extraction (step 124): At this step, the circuit function is verified at a transistor level, this in turn permits what-if refinement. Exemplary EDA software products from Synopsys, Inc. that can be used at this step include Astro-Rail™, PrimeRail, PrimeTime®, and Star-RCXT™ products.

Physical verification (step 126): In this step, the design is checked to ensure correctness for manufacturing, electrical issues, lithographic issues, and circuitry. Exemplary EDA software products from Synopsys, Inc. that can be used at this step include the Hercules™ product.

Resolution enhancement (step 128): This step involves geometric manipulations of the layout to improve manufacturability of the design. Exemplary EDA software products from Synopsys, Inc. that can be used at this step include Proteus, ProteusAF, and PSMGen products.

Mask data preparation (step 130): This step provides the "tape-out" data for production of masks to produce finished chips. Exemplary EDA software products from Synopsys, Inc. that can be used at this step include the CATS® family of products.

Embodiments of the present invention can be used during one or more of the above-described steps. Specifically, one embodiment of the present invention can be used during the resolution enhancement step 128.

Process Model

A process model models the behavior of one or more semiconductor manufacturing processes which typically involve complex physical and chemical interactions. A process model is usually determined by fitting kernel coefficients to empirical data. The empirical data is usually generated by applying the semiconductor manufacturing processes that are being modeled to one or more test layouts. For example, an optical lithography process can be used to print a test layout on a wafer. Next, the empirical data can be obtained by measuring the critical dimensions (CD) of features on the resulting wafer before and/or after the etch process. The process model can then be fit to the empirical data to determine a process model that models the optical lithography process and/or the etch process.

Once a process model is determined, it can be used in a number of applications during the design and manufacture of a semiconductor chip. For example, process models are typically used to support Optical Proximity Correction (OPC) and Resolution Enhancement Techniques (RET). These models can allow full-chip database manipulation in reasonable timeframes during the tapeout flow.

A process model can include functions or kernels that are associated with parameters and/or coefficients which are statistically fit to empirical data. A function or a kernel can be any mathematical expression.

For example, a process model may be represented as $$\sum_i C_i K_i,$$

where $K_i$ is the $i^{th}$ function or kernel, and $C_i$ is the $i^{th}$ coefficient which is associated with $K_i$. The empirical data may include values of a desired property, e.g., the CD, at different locations in the layout. Once the process model is fit to the empirical data, it can then be used to predict the value of the desired property for other layouts.

Ideally, we may want to determine coefficient values which will cause the predicted data to exactly match the empirical data. However, an exact fit is usually not possible, and even if it is possible, it may not be desirable because the resulting process model may not interpolate and/or extrapolate properly. Hence, statistical fitting techniques are typically used to determine the parameters and/or coefficients so that the error between the empirical data and the predicted data is minimized. In one embodiment, the system can use a least-squares fitting technique to determine the parameter and/or coefficient values.

A process model is considered to be robust if it interpolates and extrapolates well, i.e., if the process model generates accurate results when it is applied to layouts that are different from the layouts that were used during the fitting process. In general, the fewer modeling functions or kernels that a process model uses, the more robust it is. However, using fewer kernels may decrease the process model's accuracy. Hence, there is usually a tradeoff between the robustness and the accuracy of a process model.

The empirical data can be categorized as 1-D empirical data and 2-D empirical data. 1-D empirical data is associated with 1-D patterns in a layout, whereas 2-D empirical data is associated with 2-D patterns in the layout.

Figure 2:
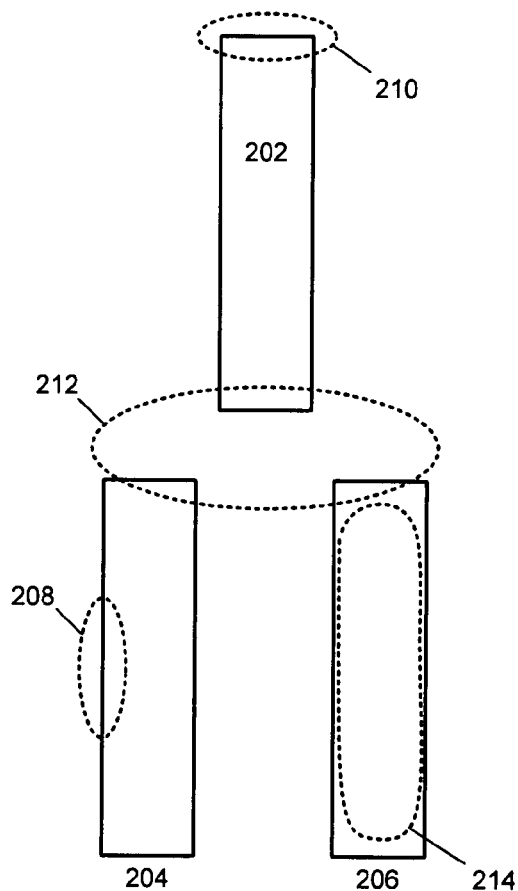
FIG. 2 illustrates 1-D patterns and 2-D patterns in accordance with an embodiment of the present invention.

FIG. 2 illustrates a 1-D pattern and a 2-D pattern in accordance with an embodiment of the present invention.

Polygons 202, 204, and 206 are part of a layout. A 1-D pattern or region typically includes a shape that is substantially longer in one dimension than in the other dimension. For example, region 208 can be a 1-D pattern. On the other hand, a 2-D pattern or region typically includes a shape that is not a 1-D pattern. For example, region 210 can be a 2-D pattern since it is not substantially longer in one dimension than in the other dimension. A 2-D pattern may also include a complex geometry. For example, region 212 can also be a 2-D pattern.

A process model can be used to predict patterns that are generated when a layout is subjected to one or more semiconductor manufacturing processes. For example, an optical process model can be used to determine the aerial image intensity at a number of locations in the layout. The aerial image intensity can then be compared with a threshold to generate a contour which predicts the shape of the patterns on the photoresist layer when the layout is subjected to photolithography. For example, an optical process model may be used to determine contour 214.

Conventional modeling techniques typically fit uncalibrated process models using 1-D empirical data. If a process model is fitted using 1-D empirical data, the process model usually generates accurate results for 1-D patterns. However, the process model may not generate accurate results for 2-D patterns. Unfortunately, fitting the process model using 1-D empirical data and 2-D empirical data usually does not result in a more accurate process model. Hence, it is desirable to develop systems and techniques that improve process model accuracy.

One embodiment of the present invention provides systems and techniques that can be used to generate process models that accurately model the effects of semiconductor manufacturing processes at 1-D regions and 2-D regions in a layout.

2-D-Pattern Detecting Kernel

Kernels that are used in process models usually do not distinguish between 1-D patterns and 2-D patterns. In other words, it is usually difficult to use the value of the convolution of the kernel with the layout to determine whether the kernel was convolved with the layout at a location that is in proximity to a 1-D pattern or at a location that is in proximity to a 2-D pattern.

However, if a kernel can be designed that can differentiate between 1-D patterns and 2-D patterns, it can be used to improve the accuracy of a process model. For example, the kernels in a process model can be fit using the 1-D empirical data, and then a 2-D-pattern detecting kernel can be added to the process model which can then be fit using the 2-D empirical data. The resulting kernel can be accurate for both 1-D patterns as well as 2-D patterns.

Note that the curvature of a contour is different for 1-D patterns and for 2-D patterns. Specifically, the curvature of a contour in proximity to 1-D patterns is substantially zero. For example, the curvature of contour 214 in proximity to the polygon edges is substantially zero. On the other hand, the curvature of a contour in proximity to a 2-D pattern is usually large. For example, the curvature of contour 214 in proximity to the line-ends is large. Hence, a 2-D-pattern detecting kernel can be developed based on this insight. One embodiment of the present invention uses a 2-D-pattern detecting kernel that is based on a curvature function to differentiate between 1-D regions and 2-D regions in a layout.

Figure 3:
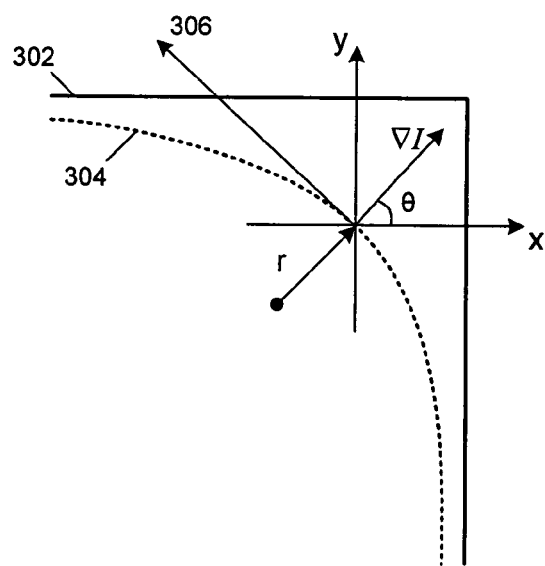
FIG. 3 illustrates how a curvature of a contour can be determined in accordance with an embodiment of the present invention.

FIG. 3 illustrates how a curvature of a contour can be determined in accordance with an embodiment of the present invention.

Corner 302 can be part of a polygon in a layout. Contour 304 can be generated using a process model. Specifically, the system can use a process model (e.g., a photolithography model) to determine an indicator value (e.g., aerial image intensity). Next, the system can compare the indicator value with a threshold to obtain contour 304.

Contour 304's curvature, κ, can be expressed as:

$$\kappa = \frac{1}{r} = \frac{\left(\frac{\partial^2 I}{\partial x^2} \cdot \sin^2\theta - 2 \cdot \frac{\partial^2 I}{\partial x \partial y} \cdot \sin\theta \cdot \cos\theta + \frac{\partial^2 I}{\partial y^2} \cdot \cos^2\theta\right)}{|\nabla I|} \quad (1)$$

where, r is the radius, I is the indicator value, $|\nabla I|$ is the gradient magnitude of the indicator value I, x and y are the axes, and θ is the angle between the radius r and the x-axis. Note that the numerator of equation (1) is the magnitude of the second order derivative of the indicator value along tangential direction 306.

The denominator of equation (1) can be zero or substantially equal to zero in an open area, which can cause the curvature to be undefined or to be an extremely large value, which may be undesirable. Hence, one embodiment uses a 2-D-pattern detecting kernel that is based on only the numerator of equation (1). In other words, one embodiment uses a 2-D-pattern detecting kernel that includes function $P_{2D}$, which can be expressed as:

$$P_{2D} = \left(\frac{\partial^2 I}{\partial x^2} \cdot \sin^2\theta - 2 \cdot \frac{\partial^2 I}{\partial x \partial y} \cdot \sin\theta \cdot \cos\theta + \frac{\partial^2 I}{\partial y^2} \cdot \cos^2\theta\right). \quad (2)$$

However, only using $P_{2D}$ as the 2-D-pattern detecting kernel can be problematic because $P_{2D}$ can have a high value at a location which is not in proximity to an edge of a polygon. Hence, one embodiment of the 2-D-pattern detecting kernel includes a filter which can filter-out the unwanted $P_{2D}$ values. In one embodiment, the 2-D-pattern detecting kernel includes filter F which can be expressed as:

$$F = \exp\left(-\frac{(I - I_0)^2}{2\sigma_f^2}\right), \quad (3)$$

where I is the indicator value, $I_0$ is a parameter that is associated with a threshold, and $\sigma_f$ is a parameter that is associated with the "width" of the filter.

Hence, in one embodiment, the 2-D-pattern detecting kernel, $K_{2D}$, can be expressed as:

$$K_{2D} = \left(\frac{\partial^2 I}{\partial x^2} \cdot \sin^2\theta - 2 \cdot \frac{\partial^2 I}{\partial x \partial y} \cdot \sin\theta \cdot \cos\theta + \frac{\partial^2 I}{\partial y^2} \cdot \cos^2\theta\right) \cdot \exp\left(-\frac{(I - I_0)^2}{2\sigma_f^2}\right) \quad (4)$$

Equations (3) and (4) have been presented for illustration purposes only, and are not intended to limit the present invention to the forms disclosed. It will be readily apparent to one skilled in the art that a number of different expressions can be used in lieu of equations (3) and (4).

Specifically, in one embodiment, a 2-D-pattern detecting kernel can be expressed as $K_{2D} = P_{2D} \cdot F$, where $P_{2D}$ can be any function that is sensitive to a contour's curvature, wherein the contour is based on an indicator's value, and F can be any filter that selects indicator values that are within a given range of values. For example, F can output a value that is substantially equal to zero for input values that are not within a given range of values, and F can output a value that is not substantially equal to zero for input values that are within a given range of values. Note that the filter's "range" can be centered on a center value which can be a parameter of the filter, and the filter's "range" can have a "width" which can also be a parameter of the filter.

Determining a Process Model Using a 2-D-Pattern Detecting Kernel

Figure 4:
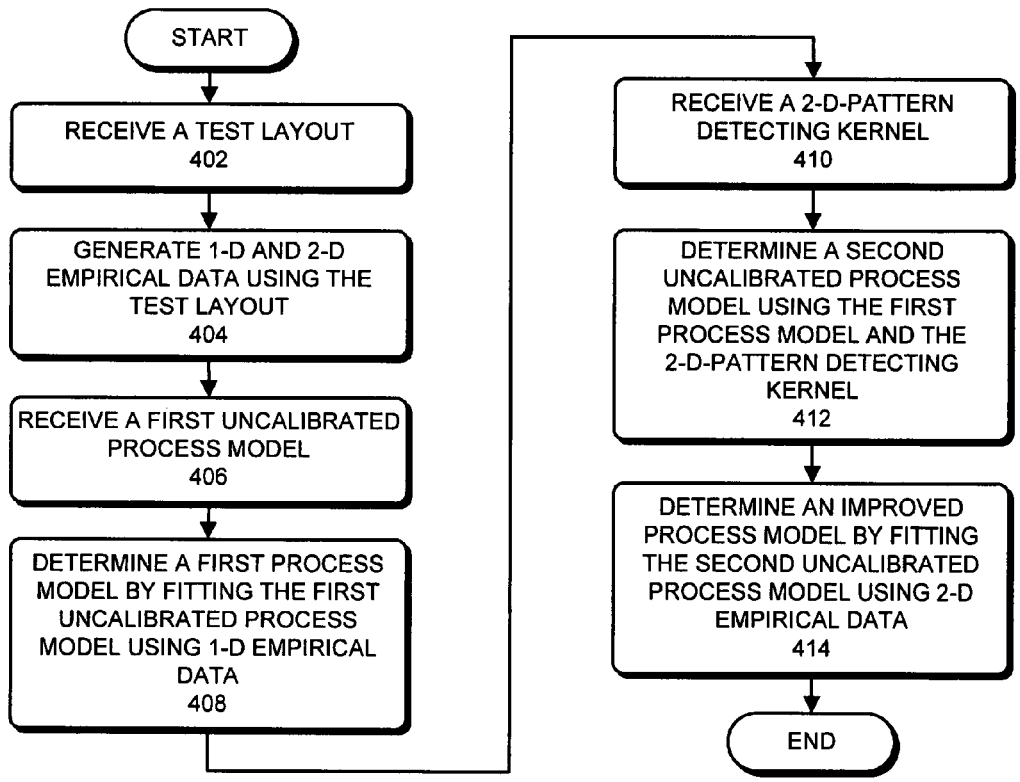
FIG. 4 presents a flow chart that illustrates a process for determining a process model using a 2-D-pattern detecting kernel in accordance with an embodiment of the present invention.

FIG. 4 presents a flow chart that illustrates a process for determining a process model using a 2-D-pattern detecting kernel in accordance with an embodiment of the present invention.

The process can begin by receiving a test layout (stage 402). The test layout may contain 1-D patterns and 2-D patterns.

Next, the process can generate 1-D empirical data and 2-D empirical data using the test layout (stage 404). In one embodiment, the test layout can be subjected to one or more semiconductor manufacturing processes. Next, the empirical data can be generated by measuring critical dimensions of features that were created in a wafer.

The system can then receive a first uncalibrated process model (stage 406). The uncalibrated process model can be a sum of product terms, wherein each product term can include a kernel and a coefficient that is associated with the kernel. In one embodiment, the first uncalibrated process model does not include a 2-D-pattern detecting kernel.

Next, the system can determine a first process model by fitting the first uncalibrated process model using the 1-D empirical data (stage 408). Alternatively, the system can fit the first uncalibrated process model using the 1-D empirical data and the 2-D empirical data.

The system can then receive a 2-D-pattern detecting kernel (stage 410). The 2-D-pattern detecting kernel can be a function that can detect 2-D patterns. Specifically, the 2-D-pattern detecting kernel can distinguish between 1-D patterns and 2-D patterns. In one embodiment, the 2-D-pattern detecting kernel can be a function that has the following properties: (a) convolving the 2-D-pattern detecting kernel with a layout at a location that is in proximity to a 1-D pattern results in a value that is substantially equal to zero (or that is less than a threshold), and (b) convolving the 2-D-pattern detecting kernel with a layout at a location that is in proximity to a 2-D pattern results in a value that is not substantially equal to zero (or that is greater than a threshold).

In one embodiment, a 2-D-pattern detecting kernel is constructed using an indicator function I(x, y) which can be expressed as:

$$I(x, y) = [K(x, y) \otimes M]^2, \quad (5)$$

where M is a function that represents the layout and K(x, y) is a generic kernel. For example, K(x, y) can be a Gaussian which can be expressed as $K(x, y) = \exp[-(x^2+y^2)/2\sigma_{2d}^2]$, where $\sigma_{2d}$ is a parameter.

The second order partial derivatives of I(x, y) can be expressed as:

$$\frac{\partial^2 I}{\partial x^2} = 2\left\{[K \otimes M] \cdot \left[\frac{\partial^2 K}{\partial x^2} \otimes M\right] + \left[\frac{\partial K}{\partial x} \otimes M\right]^2\right\}$$

$$\frac{\partial^2 I}{\partial y^2} = 2\left\{[K \otimes M] \cdot \left[\frac{\partial^2 K}{\partial y^2} \otimes M\right] + \left[\frac{\partial K}{\partial y} \otimes M\right]^2\right\} \quad (6)$$

$$\frac{\partial^2 I}{\partial x \partial y} = 2\left\{[K \otimes M] \cdot \left[\frac{\partial^2 K}{\partial x \partial y} \otimes M\right] + \left[\frac{\partial K}{\partial x} \otimes M\right] \cdot \left[\frac{\partial K}{\partial y} \otimes M\right]\right\}.$$

The second order partial derivatives shown in equation (6) can then be substituted in equation (4) to obtain a 2-D-pattern detecting kernel.

Continuing with the discussion of FIG. 4, the system can then determine an improved process model using the 2-D-pattern detecting kernel.

Specifically, the system can determine a second uncalibrated process model using the first process model and the 2-D-pattern detecting kernel (stage 412).

Next, the system can determine an improved process model by fitting the second uncalibrated process model using 2-D empirical data (stage 414).

In one embodiment, the final indicator value, $I_F$, can be expressed as:

$$I_F = I_1 + C_{2D} \cdot I_{2D}, \quad (7)$$

where $I_1$ is the contribution of the first process model, $I_{2D}$ is the contribution of the 2-D-pattern detecting kernel, and $C_{2D}$ is a coefficient that is associated with the 2-D-pattern detecting kernel. Note that $I_1$ can be expressed as $I_1 = (K_1 \otimes M)^2$, where $K_1$ is the first process model, and $I_{2D}$ can be expressed as $I_{2D} = (K_{2D} \otimes M)^2$, where $K_{2D}$ is the 2-D-pattern detecting kernel.

In one embodiment, the system only changes the parameters and/or coefficients associated with the 2-D-pattern detecting kernel to determine the improved process model. For example, the system can determine the 2-D residual error which is the error between the value predicted by the first process model and the 2-D empirical data. Next, the system can fit the parameters and/or coefficients associated with the 2-D-pattern detecting kernel using the 2-D residual error.

The above-described fitting techniques have been presented for illustration purposes, and are not intended to limit the present invention to the forms disclosed. Accordingly, many modifications and variations will be readily apparent to practitioners skilled in the art.

For example, in one embodiment, the system may iteratively change the parameters and/or coefficients associated with the first process model and the 2-D-pattern detecting kernel. For example, once the system fits the 2-D-pattern detecting kernel term using the 2-D residual error, the system can then determine a 1-D residual error by comparing the value predicted by the improved model and the 1-D empirical data. Next, the system can use the 1-D residual error to adjust the parameters and/or coefficients associated with the first process model. The system can then repeat this process iteratively, i.e., alternately fit the parameters and/or coefficients associated with the 2-D-pattern detecting kernel and the first process model. In another embodiment, the system may use both the 1-D and the 2-D empirical data to simultaneously fit the parameters and/or coefficients associated with the first process model and the second process model.

Figure 5:
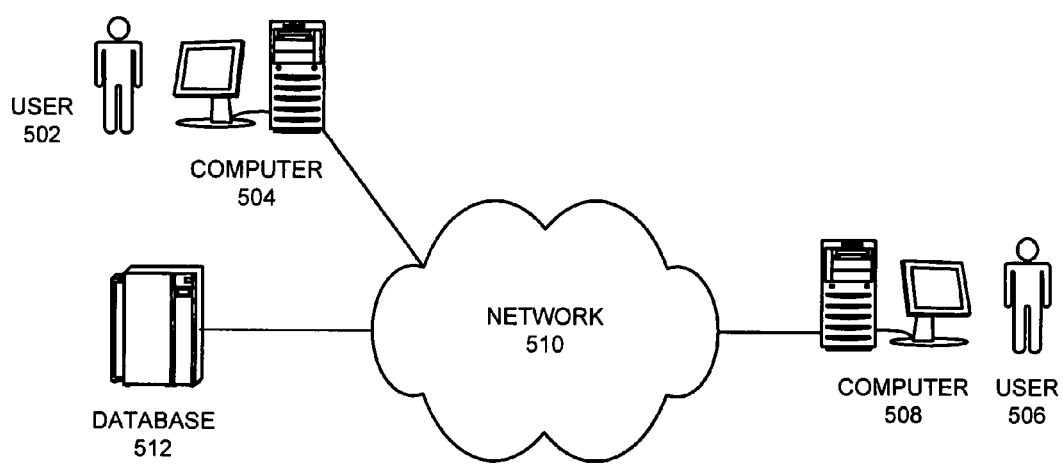
FIG. 5 illustrates how a system can store an improved process model in a computer-readable storage medium in accordance with an embodiment of the present invention.

FIG. 5 illustrates how a system can store an improved process model in a computer-readable storage medium in accordance with an embodiment of the present invention.

The system may store an improved process model by storing the parameters and/or coefficients in a computer-readable storage medium. In one embodiment, the system may store parameters, coefficients, kernel identifiers, and information that associates the parameters and coefficients with their respective kernel identifiers. A kernel identifier can be a string that identifies a kernel, or it can be an expression that represents the kernel.

User 502 may use computer 504 to fit the parameters and/or coefficients using the empirical data. Next, user 502 may store the parameters, coefficients, kernel identifiers, and information that associates the parameters and coefficients to the kernel identifiers on computer 504's hard disk or a removable computer-readable storage medium. Alternatively, user 502 may store the improved process model on database 512 which is coupled to computer 504 via network 510. User 506 may receive the improved process model from user 502 over network 510. Alternatively, user 506 may retrieve the improved process model from database 512. User 506 can load the improved process model on computer 508 by reading the parameters, coefficients, kernel identifiers, and the information that associates the parameters and coefficients to the kernel identifiers.

The improved process model can be used in a number of applications. For example, the system may receive a layout. Next, the system may use the improved process model to determine a proximity correction. Alternatively, the system may use the improved process model to predict a pattern which is expected to be generated if the layout is subjected to the semiconductor manufacturing processes that are being modeled.

CONCLUSION

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Furthermore, the foregoing descriptions of embodiments of the present invention have been presented only for purposes of illustration and description. They are not intended to be exhaustive or to limit the present invention to the forms disclosed. Accordingly, many modifications and variations will be readily apparent to practitioners skilled in the art. Additionally, the above disclosure is not intended to limit the present invention. The scope of the present invention is defined by the appended claims.

What is claimed is:

1. A method for determining an improved process model that models one or more semiconductor manufacturing processes, the method comprising:
   receiving a first process model;
   receiving a 2-D-pattern detecting kernel which is based at least on a function which is sensitive to a contour's curvature;
   receiving a second set of empirical data which is associated with 2-D patterns in a test layout; and
   determining, by computer, an improved process model using the first process model, the 2-D-pattern detecting kernel, the second set of empirical data, and the test layout.

2. The method of claim 1, wherein determining the improved process model includes:
   determining a second uncalibrated process model using the first process model and the 2-D-pattern detecting kernel; and
   fitting the second uncalibrated process model using the second set of empirical data.

3. The method of claim 2, wherein the first process model does not include any 2-D-pattern detecting kernels, wherein the first process model is determined by fitting a first uncalibrated process model using a first set of empirical data which is associated with 1-D patterns in the test layout.

4. The method of claim 3, wherein prior to receiving the first process model, the method comprises:
   receiving one or more test layouts; and
   generating the first set of empirical data and the second set of empirical data by subjecting said one or more test layouts to said one or more semiconductor manufacturing processes.

5. The method of claim 1,
   wherein convolving the 2-D-pattern detecting kernel with a layout at a location that is in proximity to a 1-D pattern results in a value that is less than a threshold; and
   wherein convolving the 2-D-pattern detecting kernel with a layout at a location that is in proximity to a 2-D pattern results in a value that is greater than the threshold.

6. The method of claim 1, wherein the 2-D-pattern detecting kernel is equal to $P_{2D} \cdot F$, where $P_{2D}$ is a function that is sensitive to a curvature of a contour, wherein the contour is determined using an indicator, and wherein F is a filter that selects indicator values that are within a given range of values.

7. A computer-readable storage medium storing instructions that when executed by a computer cause the computer to perform a method for determining an improved process model that models one or more semiconductor manufacturing processes, the instructions comprising:
   instructions for receiving a first process model;
   instructions for receiving a 2-D-pattern detecting kernel which is based at least on a function which is sensitive to a contour's curvature;
   instructions for receiving a second set of empirical data which is associated with 2-D patterns in a test layout; and
   instructions for determining an improved process model using the first process model, the 2-D-pattern detecting kernel, the second set of empirical data, and the test layout.

8. The computer-readable storage medium of claim 7, wherein determining the improved process model includes:
   determining a second uncalibrated process model using the first process model and the 2-D-pattern detecting kernel; and
   fitting the second uncalibrated process model using the second set of empirical data.

9. The computer-readable storage medium of claim 8, wherein the first process model does not include any 2-D-pattern detecting kernels, wherein the first process model is determined by fitting a first uncalibrated process model using a first set of empirical data which is associated with 1-D patterns in the test layout.

10. The computer-readable storage medium of claim 9, further comprising:
    instructions for receiving one or more test layouts; and
    instructions for generating the first set of empirical data and the second set of empirical data by subjecting said one or more test layouts to said one or more semiconductor manufacturing processes.

11. The computer-readable storage medium of claim 7,
    wherein convolving the 2-D-pattern detecting kernel with a layout at a location that is in proximity to a 1-D pattern results in a value that is less than a threshold; and
    wherein convolving the 2-D-pattern detecting kernel with a layout at a location that is in proximity to a 2-D pattern results in a value that is greater than the threshold.

12. The computer-readable storage medium of claim 7, wherein the 2-D-pattern detecting kernel is equal to $P_{2D} \cdot F$, where $P_{2D}$ is a function that is sensitive to a curvature of a contour, wherein the contour is determined using an indicator, and F is a filter that selects indicator values that are within a given range of values.

13. An apparatus for determining an improved process model that models one or more semiconductor manufacturing processes, the apparatus comprising:
    a first receiving mechanism configured to receive a first process model;
    a second receiving mechanism configured to receive a 2-D-pattern detecting kernel which is based at least on a function which is sensitive to a contour's curvature;
    a third receiving mechanism configured to receive a second set of empirical data which is associated with 2-D patterns in a test layout; and
    a first determining mechanism configured to determine an improved process model using the first process model, the 2-D-pattern detecting kernel, the second set of empirical data, and the test layout.

14. The apparatus of claim 13, wherein the first determining mechanism comprises:
    a second determining mechanism configured to determine a second uncalibrated process model using the first process model and the 2-D-pattern detecting kernel; and
    a fitting mechanism configured to fit the second uncalibrated process model using the second set of empirical data.

15. The apparatus of claim 14, wherein the first process model does not include any 2-D-pattern detecting kernels, wherein the first process model is determined by fitting a first uncalibrated process model using a first set of empirical data which is associated with 1-D patterns in the test layout.

16. The apparatus of claim 15, further comprising:

a fourth receiving mechanism configured to receive one or more test layouts; and a generating mechanism configured to generate the first set of empirical data and the second set of empirical data by subjecting said one or more test layouts to said one or more semiconductor manufacturing processes.

17. The apparatus of claim 13, wherein convolving the 2-D-pattern detecting kernel with a layout at a location that is in proximity to a 1-D pattern results in a value that is less than a threshold; and wherein convolving the 2-D-pattern detecting kernel with a layout at a location that is in proximity to a 2-D pattern results in a value that is greater than the threshold.

18. The apparatus of claim 13, wherein the 2-D-pattern detecting kernel is equal to $P_2 \cdot F$, where $P_{2D}$ is a function that is sensitive to a curvature of a contour, wherein the contour is determined using an indicator, and F is a filter that selects indicator values that are within a given range of values.

19. A computer-readable storage medium storing instructions that when executed by a computer cause the computer to perform a method for detecting a 2-D pattern, the instructions comprising:

instructions for receiving a layout that comprises patterns;

instructions for receiving a 2-D-pattern detecting kernel which is based at least on a function which is sensitive to a contour's curvature; and instructions for determining an indicator value at a location in the layout by convolving the 2-D-pattern detecting kernel with the layout at the location, wherein the indicator value indicates whether a 2-D pattern is in proximity to the location.

20. The computer-readable storage medium of claim 19, wherein the 2-D-pattern detecting kernel is equal to $P_2 \cdot F$, where $P_{2D}$ is a function that is sensitive to a contour's curvature, and F is a filter, wherein F outputs a value that is substantially equal to zero for input values that are not within a given range of values, and wherein F outputs a value that is not substantially equal to zero for input values that are within a given range of values.

* * * * *